Patented Feb. 11, 1936

2,030,619

UNITED STATES PATENT OFFICE 2,030,619

PROCESS FOR MAKING ANHYDROUS CITRIC ACID

Emil Aeckerle, Ludwigshafen-on-the-Rhine, Germany, assignor to the firm Chemische Fabrik Joh. A. Benckiser G. m. b. H., Ludwigshafen-on-the-Rhine, Germany No Drawing. Application June 25, 1934, Serial No. 732,383. In Germany April 6, 1934

2 Claims. (Cl. 260—122)

In U. S. specification No. 1,965,429, a process for making anhydrous citric acid is described in which a solution of citric acid is boiled under an absolute pressure of 1½″-1¼″ of mercury to a concentration of about 42° Bé. (gravity taken at 65.6° C.). The vacuum is then broken and the solution heated to 75–80° C. to prevent sudden crystallization. This solution is then transferred to a granulator and cooled to a temperature not lower than 41° C. This last named restriction is necessary in order to avoid the formation of hydrated citric acid.

This mode of procedure, however, entails certain drawbacks, one of the most important of which is that if the material on centrifuging is cooled down to a temeprature below 40° C. (which is difficult to avoid) the hot inspissated product forms layers of stone-like hardness during the centrifuging and washing owing to partial conversion into the hydrated modification, and these layers have frequently to be removed with the aid of hammer and chisel. Furthermore, it is not possible by means of this known process, or at least is possible only with difficulty, to obtain an anhydrous citric acid having the approximately theoretical content of 109.3% referred to the monohydrate; this is proved by the citric acid which has appeared on the market up to now and which, generally speaking, has a content of only 107.5–108%. Since, however, anhydrous citric acid is purposely made for use on those occasions on which absolute freedom from water is desired, the water content, even though it is small, of the so-called "anhydrous" citric acid hitherto available on the market is to be regarded as a decided disadvantage. The yield obtained by the process heretofore usual also depended essentially on the fact that the concentration of the inspissated product in vacuo could be carried out only to such an extent that the said inspissated product did not set to a solid block as a result of the cooling which takes place during the standing and the further working up, and this rendered the further treatment, and more particularly the centrifuging and the purifying entailed, impossible. In these circumstances a yield of only about 50 to 55% of the citric acid introduced could be obtained.

The new process forming the subject of the present invention as compared with the state of the art represents a considerable advance. The new process consists in evaporating the aqueous citric acid solution in vacuo (cf. Buchner & Witter, Berichte der Deutschen Chemischen Gesellschaft, 1892, page 1159; when evaporating in vacuo anhydrous citric acid is always obtained) until a concentration of about 48° Bé. is reached, mashing up this inspissated product after running off into the crystallization vessel with citric acid-sulphuric acid solution, and then stirring up this mash until room temperature is reached, whereupon the crystals are separated from the mother liquor in the usual way by centrifuging. The solution of citric acid and sulphuric acid used in this process preferably contains in 100 litres, 18 kgs. of citric acid containing water of crystallization and 25 litres of concentrated sulphuric acid. The concentration of the inspissated mass in vacuo may, according to the present invention, be forthwith considerably increased since the subsequent addition of the solution containing citric acid and sulphuric acid prevents any setting on the part of the inspissated material which is run off. The solution of citric acid and sulphuric acid is preferably added whilst the inspissated product is still capable of being thoroughly stirred to a certain extent. In this way it is possible to obtain with a single heating operation a yield of about 75% of the citric acid introduced, that is to say, 40% more than in the case of the processes heretofore known.

The composition of the mixture of citric acid and sulphuric acid is chosen so that no conversion of the anhydrous citric acid into the monohydrated form can take place in spite of the cooling down of the inspissated material to room temperature. One is not compelled therefore to work up the inspissated mass run off with maximum rapidity within a definite time and temperature limits, and the other disadvantage mentioned above, namely the hardening of the mass in the centrifuge, is avoided with certainty. Further, the process provided by this invention enables an anhydrous citric acid to be prepared having an always constant, approximately theoretical, content of 109%. The solution of citric acid and sulphuric acid may be used repeatedly if care is taken to secure a satisfactory separation of mother liquor and washing water during the centrifuging. By using the solution of citric acid and sulphuric acid in the manner stated all impairing action of sulphuric acid on the product is excluded.

What I claim is:—

1. A process for making anhydrous citric acid, consisting in boiling aqueous citric acid solutions in vacuo until an inspissated product is obtained having a concentration of about 48° Bé. running off the said inspissated product into a crystallizing vessel, mashing up the resulting crystal pulp during the cooling period with a mixture of citric acid and sulphuric acid of such a composition that citric acid can exist in it even at room temperature only in its anhydrous form, then stirring the mass up until it attains the temperature of the room, and separating the resulting crystals of anhydrous acid from the mother liquor.

2. A process for making anhydrous citric acid, consisting in boiling aqueous citric acid solutions in vacuo until an inspissated product is obtained having a concentration corresponding to about 48° Bé., running off the said inspissated product into a crystallizing vessel, mashing up the resulting crystal pulp with a solution containing per 100 litres at least 18 kg. of crystallized citric acid and 25 litres of concentrated sulphuric acid, stirring the mixture up until it attains the temperature of the room, and separating the resulting crystals of anhydrous acid from the mother liquor.

EMIL AECKERLE.